United States Patent
Anubolu et al.

(10) Patent No.: US 10,102,168 B2
(45) Date of Patent: Oct. 16, 2018

(54) SCALABLE LOW-LATENCY MESH INTERCONNECT FOR SWITCH CHIPS

(71) Applicant: BROADCOM CORPORATION, Irvine, CA (US)

(72) Inventors: Surendra Anubolu, Fremont, CA (US); Mohan Venkatachar Kalkunte, Saratoga, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 164 days.

(21) Appl. No.: 15/063,387

(22) Filed: Mar. 7, 2016

(65) Prior Publication Data

US 2017/0228335 A1    Aug. 10, 2017

Related U.S. Application Data

(60) Provisional application No. 62/293,287, filed on Feb. 9, 2016.

(51) Int. Cl.
| | |
|---|---|
| *G06F 13/00* | (2006.01) |
| *G06F 13/40* | (2006.01) |
| *G06F 9/48* | (2006.01) |
| *G06F 13/42* | (2006.01) |

(52) U.S. Cl.
CPC ........ *G06F 13/4022* (2013.01); *G06F 9/4881* (2013.01); *G06F 13/4282* (2013.01)

(58) Field of Classification Search
CPC ..................................................... H04L 49/351
See application file for complete search history.

(56) References Cited

U.S. PATENT DOCUMENTS

| | | | | |
|---|---|---|---|---|
| 2003/0063562 | A1* | 4/2003 | Sarkinen | ................. H04L 47/10 370/230 |
| 2013/0179642 | A1* | 7/2013 | Plondke | .............. G06F 12/0811 711/142 |
| 2013/0336332 | A1* | 12/2013 | Kwan | ................. H04L 12/6418 370/412 |

* cited by examiner

*Primary Examiner* — Henry Tsai
*Assistant Examiner* — Juanito Borromeo
(74) *Attorney, Agent, or Firm* — Morgan, Lewis & Bockius LLP

(57) ABSTRACT

A device implementing a scalable low-latency mesh may include a memory management unit, an egress processor, and an egress cell circuit that includes at least a first queue and a second queue. The memory management unit may be configured to buffer first cells for transmission. The egress cell circuit may be configured to queue the first cells from the memory management unit in the first queue, queue second cells from an off-chip memory management unit of another device in the second queue, and schedule the first cells from the first queue and second cells from the second queue for transmission via an egress processor. The egress processor may be configured to transmit the first and second cells over at least one first port.

20 Claims, 8 Drawing Sheets

SCALABLE LOW-LATENCY MESH INTERCONNECT FOR SWITCH CHIPS

CROSS-REFERENCE TO RELATED APPLICATIONS

The present application claims the benefit of U.S. Provisional Patent Application Ser. No. 62/293,287, entitled "Scalable Low-Latency Mesh Interconnect for Switch Chips," filed on Feb. 9, 2016, which is hereby incorporated by reference in its entirety for all purposes.

TECHNICAL FIELD

The present description relates generally to a scalable low-latency mesh, including a scalable low latency mesh interconnect for switch chips of a switch device.

BACKGROUND

In the enterprise switch market, bandwidth per switch chip is doubling every eighteen months. As a result of the bandwidth increase, power density is also increasing while cost is decreasing. In order to support the enterprise switch market, significant cooling technology is required to support the continuing growth with the single system on a chip (SoC) implementations. However, an efficient way to scale a system using multiple switch chips may allow for a reduction in the cooling and/or power requirements.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
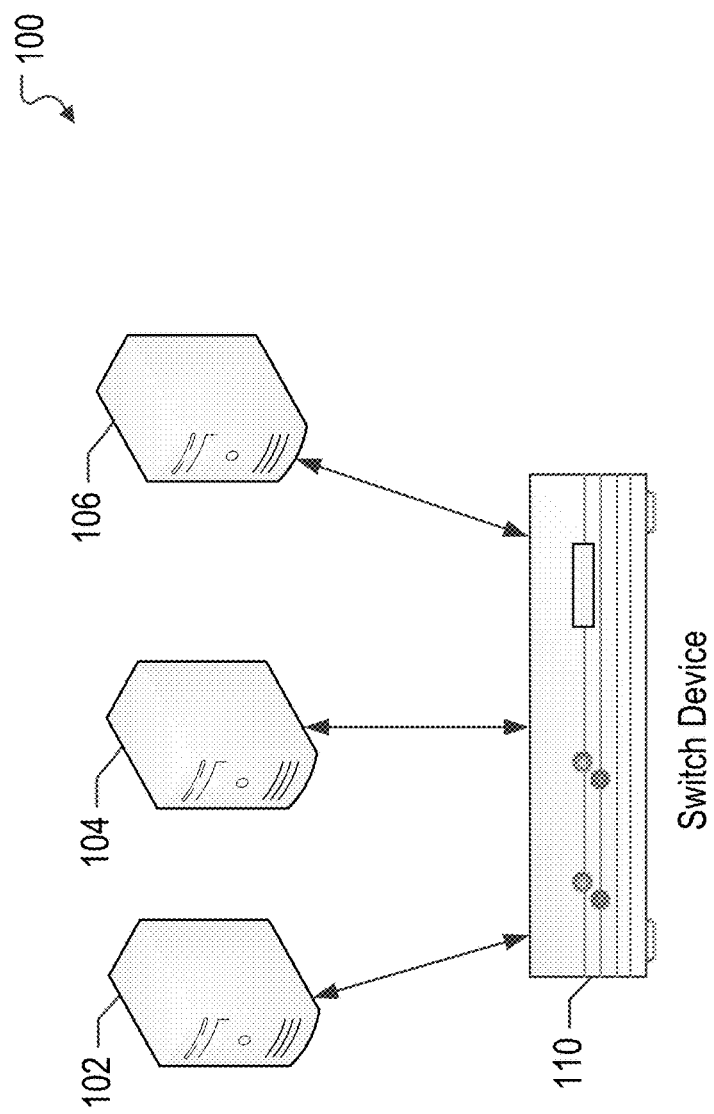
FIG. 1 illustrates an example network environment in which a switch device implementing a scalable low-latency mesh interconnect for switch chips may be implemented in accordance with one or more implementations.

FIG. 1 illustrates an example network environment 100 in which a switch device 110 implementing a scalable low-latency mesh interconnect for switch chips may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes various electronic devices 102, 104, 106, such as one or more servers, computers, data storage devices, network components, network devices, etc. In one or more implementations, the network environment 100 includes a set of servers, a server bank, a storage area network, and/or a vast network of interconnected computers or network devices. In one or more implementations, the network environment 100 includes one or more other devices, such as, for example, one or more mobile devices, tablet devices, set-top box (STB) devices, storage devices, desktop computers, routers, switches, bridges, or any other machine or device.

One or more network devices, such as the switch device 110, may be implemented in the network environment 100 to facilitate communication between the one or more electronic devices 102, 104, 106. The electronic devices 102, 104, 106 of the network environment 100, are connected or otherwise in communication with each other, through or using the switch device 110. For example, the electronic devices 102, 104, 106 may each be coupled to one or more physical ports of the switch device 110 by a network transmission line, such as an Ethernet transmission line, a coaxial transmission line, an optical transmission line, fibre channel, or generally any transmission line. In one or more implementations, one or more of the electronic devices 102, 104, 106 is wirelessly coupled to the switch device 110. The switch device 110 and/or one or more of the electronic devices 102, 104, 106 may be and/or may include all or part of the electronic system discussed below with respect to FIG. 8.

The switch device 110 may include a number of integrated circuits, or chips, that are referred to as switch chips. The switch chips may be mounted on a common substrate and/or one or more of the switch chips may be mounted on separate substrates, such as separate line cards. Each switch chip is coupled to one or more ports of the switch device 110 and processes data units transmitted through and/or received over, the ports. For explanatory purposes, the data units may be primarily referred to herein as cells, e.g. portions of packets; however, the data units may be packets, protocol data units (PDUs), chunks, or generally any delineable data unit. To facilitate processing the data units, each of the switch chips may include one or more ingress processors, egress processors, and/or memory management units (MMUs).

In the subject system of a scalable low-latency mesh interconnect for switch chips, the switch chips are interconnected within the switch device 110 using a low latency mesh network. The switch chips may be connected such that, at most, a single store and forward operation occurs for any data unit routed through the switch device 110. Furthermore, each data unit may only pass through, at most, a single ingress processor and a single egress processor, across the entire multi-chip architecture, thereby incurring a single forwarding latency for each data unit. In one or more implementations, the onboard mesh connection of the switch chips may include a serializer/deserializer (SerDes) interface running at a high speed. In one example, each switch chip's packet processor may be individually capable of a particular bandwidth. However, when the switch chips are interconnected in the switch device 110 using the subject system, the packet processors of the chips may run at a fraction of their full capacity, thereby reducing the power consumption of the chips and consequently the switch device. An example switch device 110 implementing the subject system is discussed further below with respect to FIGS. 2 and 3.

In one or more implementations, a fabric implementing the subject system may carry a system header with each data unit, such as each packet, in order to facilitate implementing the subject system. The fabric may be byte packed, e.g. the Ethernet interpacket gap may be used to pack the system header. The header may have a variable size, such as a first size for basic unicast flows and a second size when features such as instrumentation are turned on. The first size may match the interpacket gap thereby not requiring any overspeed.

Figure 2:
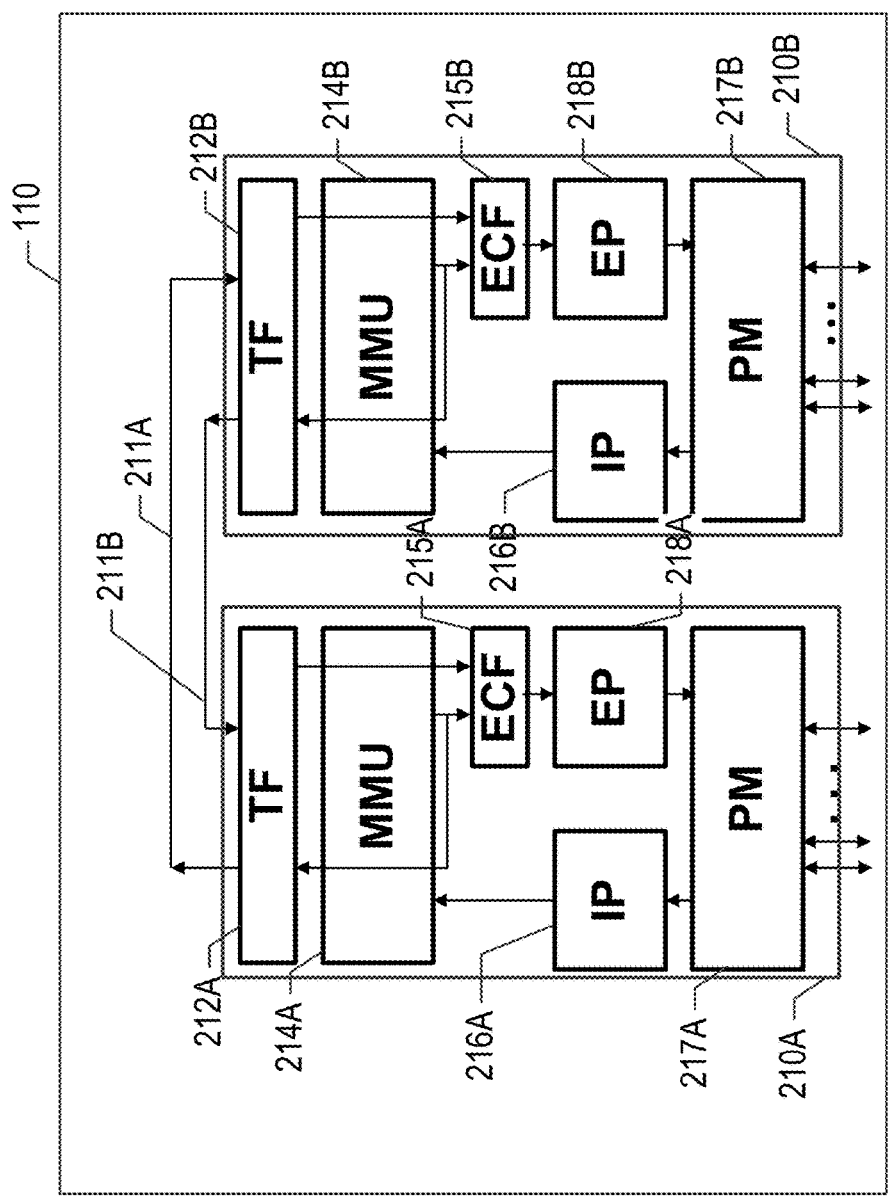
FIG. 2 illustrates an example switch device implementing a scalable low-latency mesh interconnect for two switch chips in accordance with one or more implementations.

FIG. 2 illustrates an example switch device 110 implementing a scalable low-latency mesh interconnect for two switch chips 210A-B in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. Furthermore, one or more of the illustrated components may be merged/combined into a single component and/or one or more of the illustrated components may be split into multiple separate components.

The switch device 110 includes a first switch chip 210A and a second switch chip 210B that are interconnected by links 211A-B. The first switch chip 210A includes a transit fifo 212A, a memory management unit (MMU) 214A, an egress cell fifo 215A, an ingress processor 216A, a port macro 217A, and an egress processor 218A. The second switch chip 210B may include a transit fifo 212B, an MMU 214B, an egress cell fifo 215B, an ingress processor 216B, a port macro 217B, and an egress processor 218B.

The ingress processors 216A-B may be, for example, ingress packet processors, and the egress processors 218A-B may be, for example, egress packet processors. The port macros 217A-B may each be coupled to separate sets of one or more ports. For example, the electronic device 102 of FIG. 1 may be connected to a port coupled to the port macro 217A of the switch chip 210A, and the electronic device 104 of FIG. 1 may be connected to a port coupled to the port macro 217B of the switch chip 210B. The links 211A-B may each be separate physical connections, e.g. on a substrate, that connect the switch chips 210A-B. The links 211A-B may each be bidirectional or unidirectional.

The MMUs 214A-B of each switch chip 210A-B may each include virtual output queues corresponding to each port coupled to each switch chip 210A-B. The egress cell fifos 215A-B of each of the switch chips 210A-B includes output queues for all of the ports in the switch device 110, such as 256 ports, or any number of ports. The switch chips 210A-B utilize the transit fifos 212A-B to support the mesh network topology. The transit fifos 212A-B each drives a serializer-deserializer interface for the mesh network connections via the links 211A-B. The transit fifos 212A-B may each implement cut-through switching by looking at the header to either copy a cell, drop a cell, or pass through the cell. The transit fifos 212A-B may also be referred to as transit circuits. An example transit fifo 212A is discussed further below with respect to FIG. 4, and an example process of an example transit fifo 212A is discussed further below with respect to FIG. 6.

The switch chips 210A-B also utilize the egress cell fifos 215A-B to pull/receive cells from the respective MMUs 214A-B and the respective transit fifos 212A-B as input. The egress cell fifos 215A-B may be cell-based, packet-based, or generally any data unit based. The egress cell fifos 215A-B may also be referred to as egress cell circuits. An example egress cell fifo 215A is discussed further below with respect to FIG. 5, and an example process of an example egress cell fifo 215A is discussed further below with respect to FIG. 7.

In operation, the ingress processor 216A receives cells from the coupled ports via the port macro 217A. The ingress processor 216A stores the cells for transmission in the MMU 214A. In one or more implementations, for local cut-through switching, the ingress processor 216A provides the cells directly to the egress cell fifo 215A or the egress processor 218A. In one or more implementations, the local cut-through switching may be dependent on the occupancy of the queues of the egress cell fifo 215A. The egress cell fifo 215A retrieves cells from the on-chip MMU 214A and queues the cells in dedicated fifos (or queues/buffers), for transmission over the coupled ports via the egress processor 218A and the port macro 217A. The components of the switch chip 210A may be referred to as on-chip (relative to the egress cell fifo 215A), and the components of the switch chip 210B (or any other chip), may be referred to as off-chip (with respect to the egress cell fifo 215A).

The egress cell fifo 215A also retrieves cells from the off-chip MMU 214B of the switch chip 210B and queues the cells in separate dedicated fifos for transmission over the coupled ports via the egress processor 218A and the port macro 217A. For example, the egress cell fifo 215A requests cells from the off-chip MMU 214B via the transit fifo 212A, the link 211A, and the transit fifo 212B. The transit fifo 212A retrieves the cells from the off-chip MMU 214B via the transit fifo 212B (without the cells passing through the egress processor 218B of the switch chip 210B), and the transit fifo 212A provides the cells directly to the egress cell fifo 215A, e.g. bypassing the on-chip MMU 214A. The egress cell fifo 215A then queues the cells retrieved from the off-chip MMU 214B for transmission over coupled ports via the egress processor 218A and the port macro 217A, e.g. dispersed within the transmissions of the cells retrieved from the on-chip MMU 214A. Thus, some of the cells retrieved from the off-chip MMU 214B are initially received via the ingress processor 216B of the switch chip 210B, but are not transmitted via the egress processor 218B of the switch chip 210B, but rather the egress processor 218A of the switch chip 210A. The egress cell fifo 215B of the switch chip 210B may operate in a similar manner.

The switch device 110 may perform multicast replication at the one of the MMUs 214A-B of the one of the switch chips 210A-B that is the source of the multicast. The switch device 110 may also utilize priority flow control to prevent draining from the egress cell fifos 215A-B that are organized per queue, and credit control may utilized to prevent draining from the source MMUs 214A-B.

The switch device 110 may also utilize metering on equal cost multipath (ECMP) and/or link aggregation protocol (LAG) channels within each of the switch chips 210A-B and/or for ports across the switch chips 210A-B. For example, a slow update may be utilized to synchronize the meter state across the mesh network for both of the switch chips 210A-B. The update rate can be low when the number of switch chips 210A-B is low.

In one or more implementations, one or more of the switch chips 210A-B, the transit fifos 212A-B, the MMUs 214A-B, the egress cell fifos 215A-B, the ingress processors 216A-B, the port macros 217A-B, the egress processors 218A-B, and/or the links 211A-B may be implemented in software, and/or may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or may be implemented in a combination of both. Additional features and functions of these modules according to various aspects of the subject technology are further described in the present disclosure.

Figure 3:
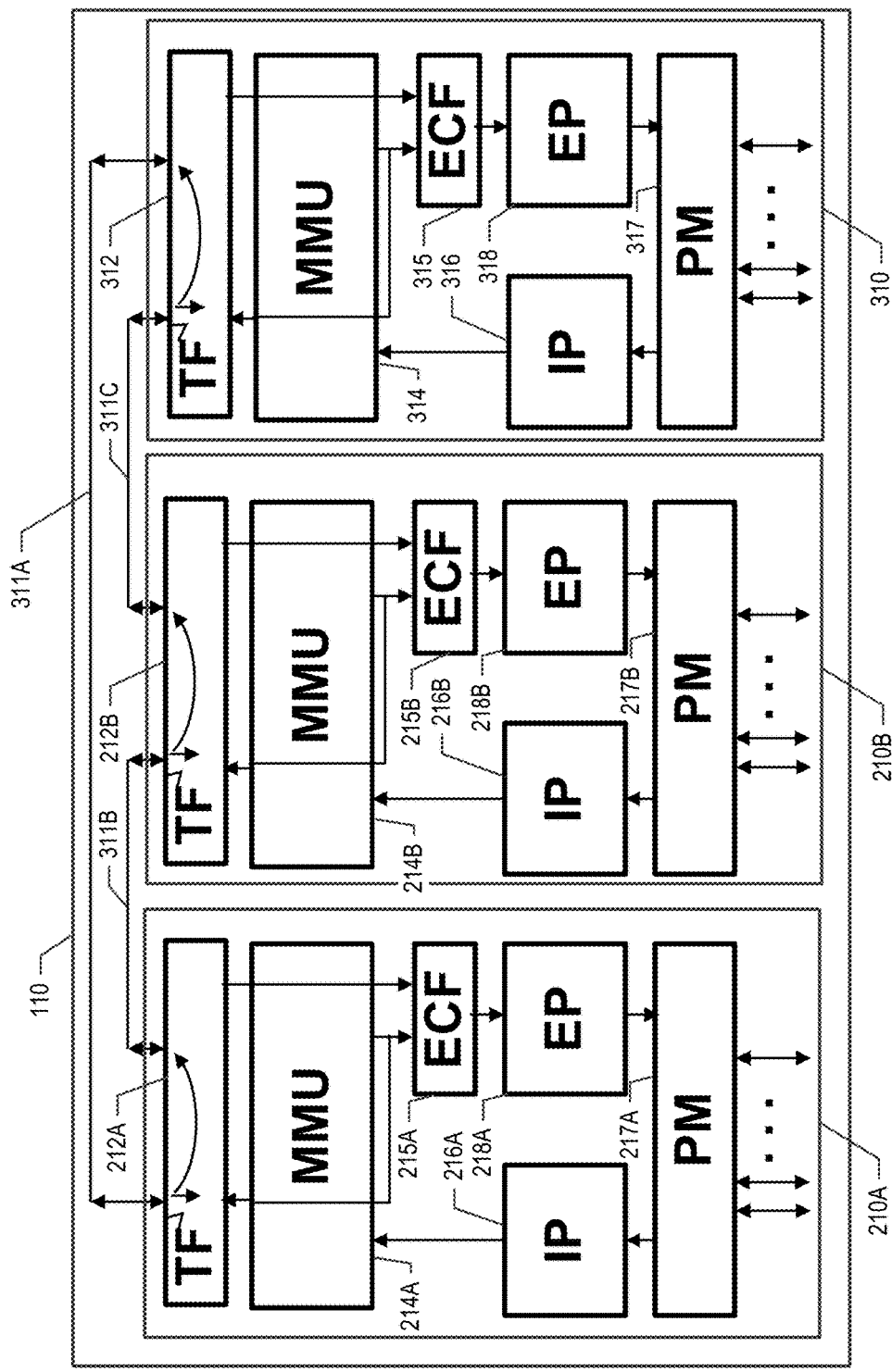
FIG. 3 illustrates an example switch device implementing a scalable low-latency mesh interconnect for three switch chips in accordance with one or more implementations.

FIG. 3 illustrates an example switch device 110 implementing a scalable low-latency mesh interconnect for three switch chips 210A-B, 310 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. Furthermore, one or more of the illustrated components may be merged/combined into a single component and/or one or more of the illustrated components may be split into multiple separate components.

The switch device 110 includes the switch chips 210A-B of FIG. 2 as well as a third switch chip 310. The switch chip 310 includes a transit fifo 312, an MMU 314, an egress cell fifo 315, an ingress processor 316, a port macro 317, and an egress processor 318. The switch chips 210A-B, 310 are interconnected via links 311A-C. The links 311A-C may each be unidirectional or bidirectional. Thus, as shown in FIG. 3, the switch chip 210A can communicate directly with the switch chip 310 via the link 311A, and the switch chip 210A can communicate indirectly with the switch chip 310, e.g. using the switch chip 210B as an intermediary, via the links 311B-C.

In order to support the multiple different links 311A-C, the transit fifos 212A-B, 312 may each include a scheduler, as is discussed further below with respect to FIG. 4. The schedulers of the transit fifos 212A-B, 312 may track link occupancy and may share link state information, such as link and path utilization statistics, with each other. The schedulers of the individual transit fifos 212A-B, 312 may use the link state information to determine the appropriate link to transmit a given cell over, e.g. to ensure that the links 311A-C are balanced on a cell-by-cell basis. Thus, the transit fifo 212A may select the link 311A or the links 311B-C for transmitting a given cell to the transit fifo 312, and the transit fifo 212A may select the link 311B or the links 311A,C for transmitting a given cell to the transit fifo 212B. The transit fifos 212B, 312 may operate in a similar manner. The transit fifos 212A-B, 312 may determine whether to copy, pass-thru, or delete a given cell based at least in part on the system header associated with the cell.

The subject system may also be utilized in a configuration plane implementation where the switch chips 210A-B, 310 are presented as three endpoints of a memory map, such as three peripheral component interconnect express (PCIe or PCI-E) endpoints. In this instance, the switch chips 210A-B, 310 may be coupled to a PCIe riser card which is coupled to a memory module and a host CPU. One of the switch chips 210A-B, 310 is selected or elected to perform the packet punt path for the implementation. The CPU queues can be load balanced and a given queue can be associated with a single one of the switch chips 210A-B, 310.

In one or more implementations, one or more of the switch chips 210A-B, 310, the transit fifos 212A-B, 312, the MMUs 214A-B, 314, the egress cell fifos 215A-B, 315, the ingress processors 216A-B, 316, the port macros 217A-B, 317, the egress processors 218A-B, 318, and/or the links 311A-C may be implemented in software, and/or may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or may be implemented in a combination of both. Additional features and functions of these modules according to various aspects of the subject technology are further described in the present disclosure.

Figure 4:
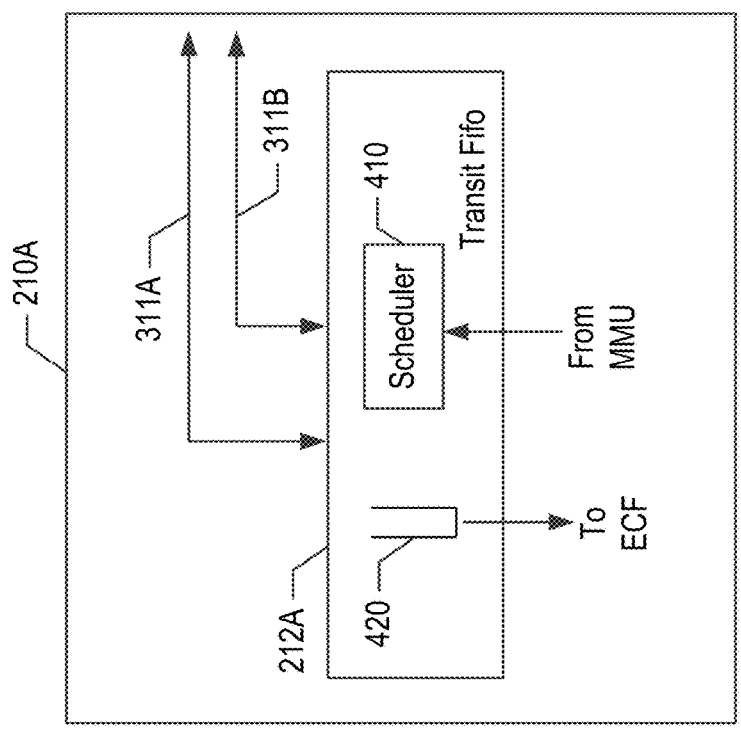
FIG. 4 illustrates an example transit first-in-first-out (fifo) of an example switch chip of a switch device implementing a scalable low-latency mesh interconnect for switch chips in accordance with one or more implementations.

FIG. 4 illustrates an example transit fifo 212A of an example switch chip 210A of a switch device 110 implementing a scalable low-latency mesh interconnect for switch chips in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. Furthermore, one or more of the illustrated components may be merged/combined into a single component and/or one or more of the illustrated components may be split into multiple separate components.

The example transit fifo 212A includes a scheduler 410 for scheduling cells for transmission over the links 311A-B, and one or more buffers 420 for buffering cells received over the links 311A-B. The one or more buffers 420 may be a small buffer that is utilized to latency match, e.g. account for latency between the cells received over the different links 311A-B, and to keep received cells in order.

In operation, the transit fifo 212A may receive a request for cells stored in the MMU 214A. The request may be received from, for example, the transit fifo 212B on behalf of the egress cell fifo 215B and/or the transit fifo 312 on behalf of the egress cell fifo 315. The transit fifo 212A schedules the requested cells for transmission over one of the links 311A-B, retrieves the requested cells from the MMU 214A at the scheduled time and transmits the cells to the transit fifo 212B and/or the transit fifo 312 via a selected one of the links 311A-B. The transit fifo 212A may receive link state information from the transit fifos 212B, 312 and may provide link state information to the transit fifos 212B, 312. The scheduler 410 determines the appropriate link for transmitting each cell based at least in part on the received link state information.

The transit fifo 212A also requests cells from the MMUs 214B, 314 on behalf of the egress cell fifo 215A. The requested cells are received over one or more of the links 311A-B and are buffered in the one or more buffers 420. Once the cells have been reordered, if necessary, the transit fifo 212A transmit the cells directly to the egress cell fifo 215A, bypassing the MMU 214A, thereby minimizing the number of read/write operations for processing the cells and consequently decreasing the latency associated with processing the cells.

In one or more implementations, one or more of the switch chip 210A, the transit fifo 212A, the scheduler 410, the buffer 420, and/or the links 311A-B may be implemented in software, and/or may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or may be implemented in a combination of both. Additional features and functions of these modules according to various aspects of the subject technology are further described in the present disclosure.

Figure 5:
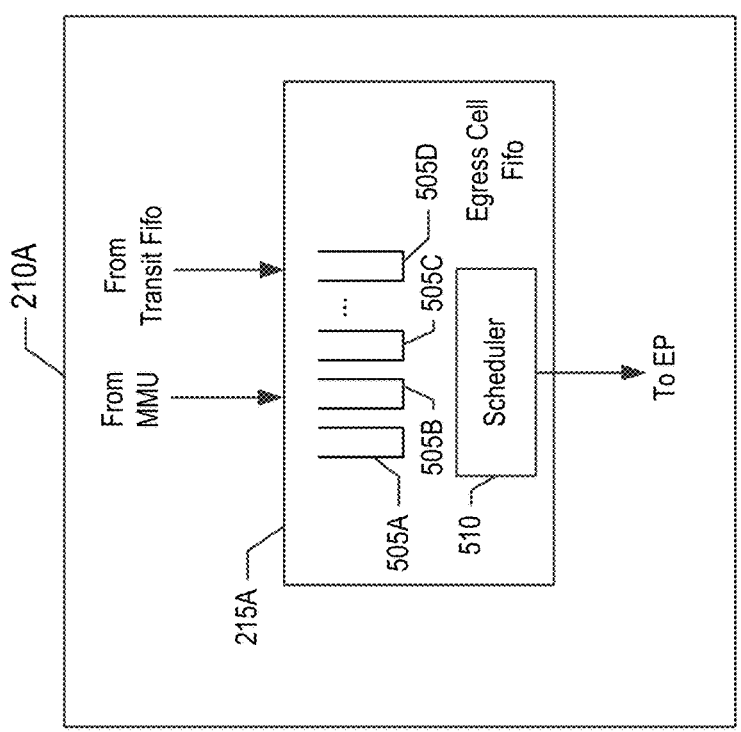
FIG. 5 illustrates an example egress cell fifo of an example switch chip of a switch device implementing a scalable low-latency mesh interconnect for switch chips in accordance with one or more implementations.

FIG. 5 illustrates an example egress cell fifo 215A of an example switch chip 210A of a switch device 110 implementing a scalable low-latency mesh interconnect for switch chips in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. Furthermore, one or more of the illustrated components may be merged/combined into a single component and/or one or more of the illustrated components may be split into multiple separate components.

The egress cell fifo 215A includes one or more queues 505A-D and a scheduler 510. For example, the egress cell fifo 215A may include a separate dedicated queues for each output queue of each port of the switch device 110, e.g. across each of the switch chips of the switch device 110. Thus, if the switch device 110 includes three switch chips 212A-B, 312, each of the switch chips 212A-B, 312 is coupled to 64 ports, and each port is associated with 4 output queues, then the egress cell fifo 215A includes 64*4*3=768 queues. Thus, when the egress cell fifo 215A receives cells from one of the off-chip MMUs 214B, 314, the egress cell fifo 215A queues the cells in the appropriate one of the queues 505A-D associated with the one of the off-chip MMUs 214B, 314.

In operation, the egress cell fifo 215A retrieves cells from a read port of the on-chip MMU 214A, and from the off-chip MMUs 214A, 314, via the transit fifo 212A. The egress cell fifo 215A retrieves cells from the respective MMUs 214A-B, 314 as space allows in the queues 505A-D associated with the respective MMUs 214A-B, 314. The scheduler 510 schedules output queues to a given coupled port using, e.g., source based credit for each port. The scheduler 510 ensures that the cells from the on-chip MMU 214A and the cells from the off-chip MMUs 214B, 314 are given fair access to a given port.

In one or more implementations, one or more of the switch chip 210A, the egress cell fifo 215A, the queues 505A-D, and/or the scheduler 510 may be implemented in software, and/or may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or may be implemented in a combination of both. Additional features and functions of these modules according to various aspects of the subject technology are further described in the present disclosure.

Figure 6:
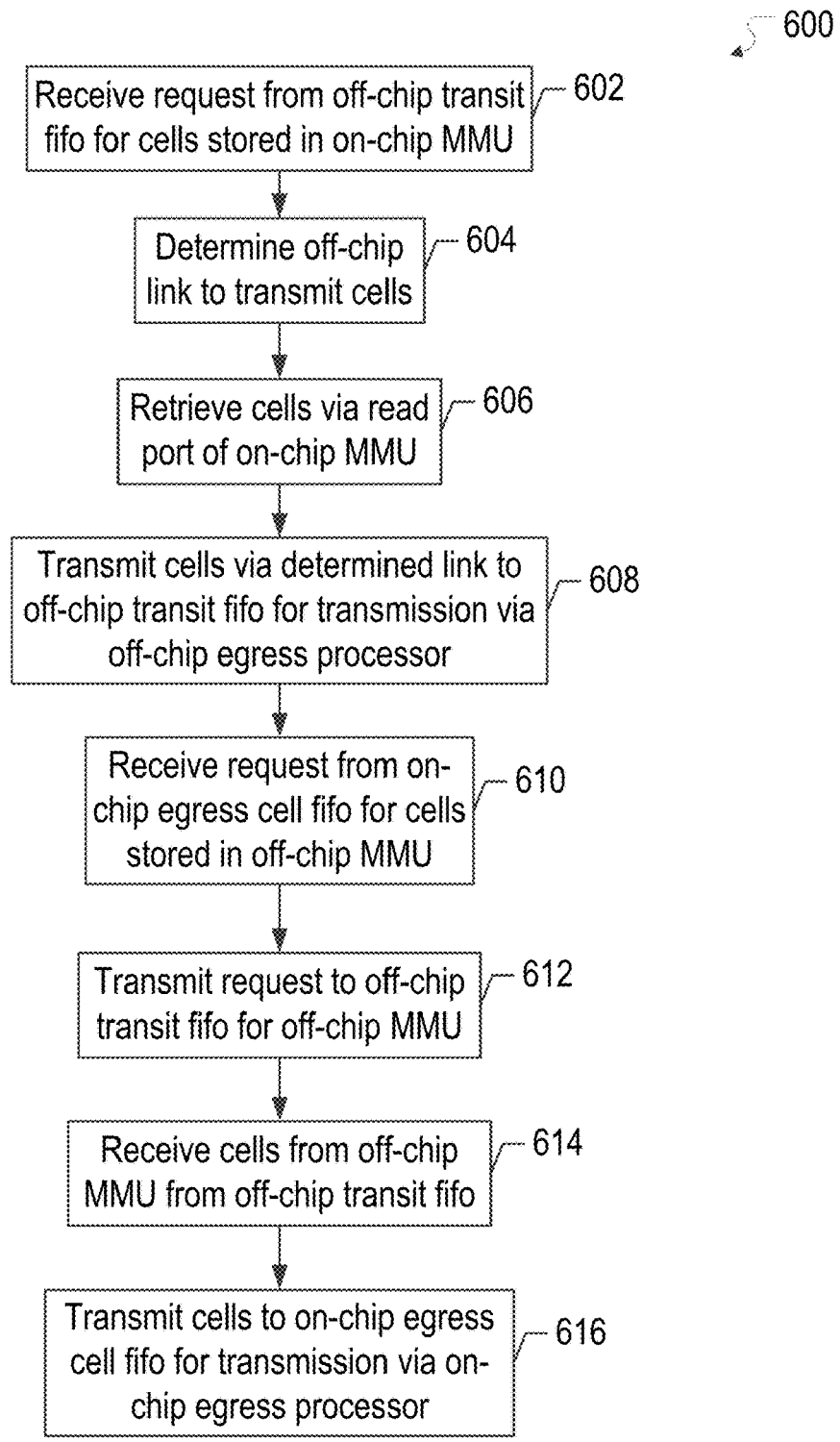
FIG. 6 illustrates a flow diagram of an example process of a transit fifo of an example switch chip of a switch device implementing a scalable low-latency mesh interconnect for switch chips in accordance with one or more implementations.

FIG. 6 illustrates a flow diagram of an example process 600 of a transit fifo 212A of an example switch chip 210A of a switch device 110 implementing a scalable low-latency mesh interconnect for switch chips in accordance with one or more implementations. For explanatory purposes, the example process 600 is primarily described herein with reference to the transit fifo 212A of the switch chip 210A of the switch device 110 of FIGS. 2-3; however, the example process 600 is not limited to the transit fifo 212A of the switch chip 210A of FIGS. 2-3, e.g. the example process 600 may be performed by one or more of the transit fifos 212B, 312 of the switch chips 210B, 310, and/or the example process 600 may be performed by one or more components of the transit fifo 212A. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed.

The transit fifo 212A receives a request from an off-chip transit fifo 212B for cells stored in the on-chip MMU 214A (602). The transit fifo 212A determines an appropriate link to transmit the cells to the off-chip transit fifo 212B (604). For example, if there are multiple links 311A-C for transmitting cells to the off-chip transit fifo 212B, the transit fifo 212A determines the appropriate link based on link state information, such as link occupancy information, received from the off-chip transit fifo 212B and/or the off-chip transit fifo 312. The transit fifo 212A retrieves the requested cells directly from the read port of the MMU 214A (606) and transmits the cells via the determined link to the off-chip transit fifo 212B for transmission via an off-chip egress processor 218B (608). In this manner, the cells retrieved from the MMU 214A bypass, e.g. are not processed by, the on-chip egress processor 218A.

The transit fifo 212A receives a request from the on-chip egress cell fifo 215A for cells stored in an off-chip MMU, such as the off-chip MMU 214B (610). The transit fifo 212A transmits the request to the off-chip transit fifo 212B that is on the same switch chip 212B as the off-chip MMU 214B (612). The transit fifo 212A receives the cells from the off-chip MMU 214B from the off-chip transit fifo 212B (614). The transit fifo 212A transmits the received cells to the on-chip egress cell fifo 215A for transmission via the on-chip egress processor 218A (616).

Figure 7:
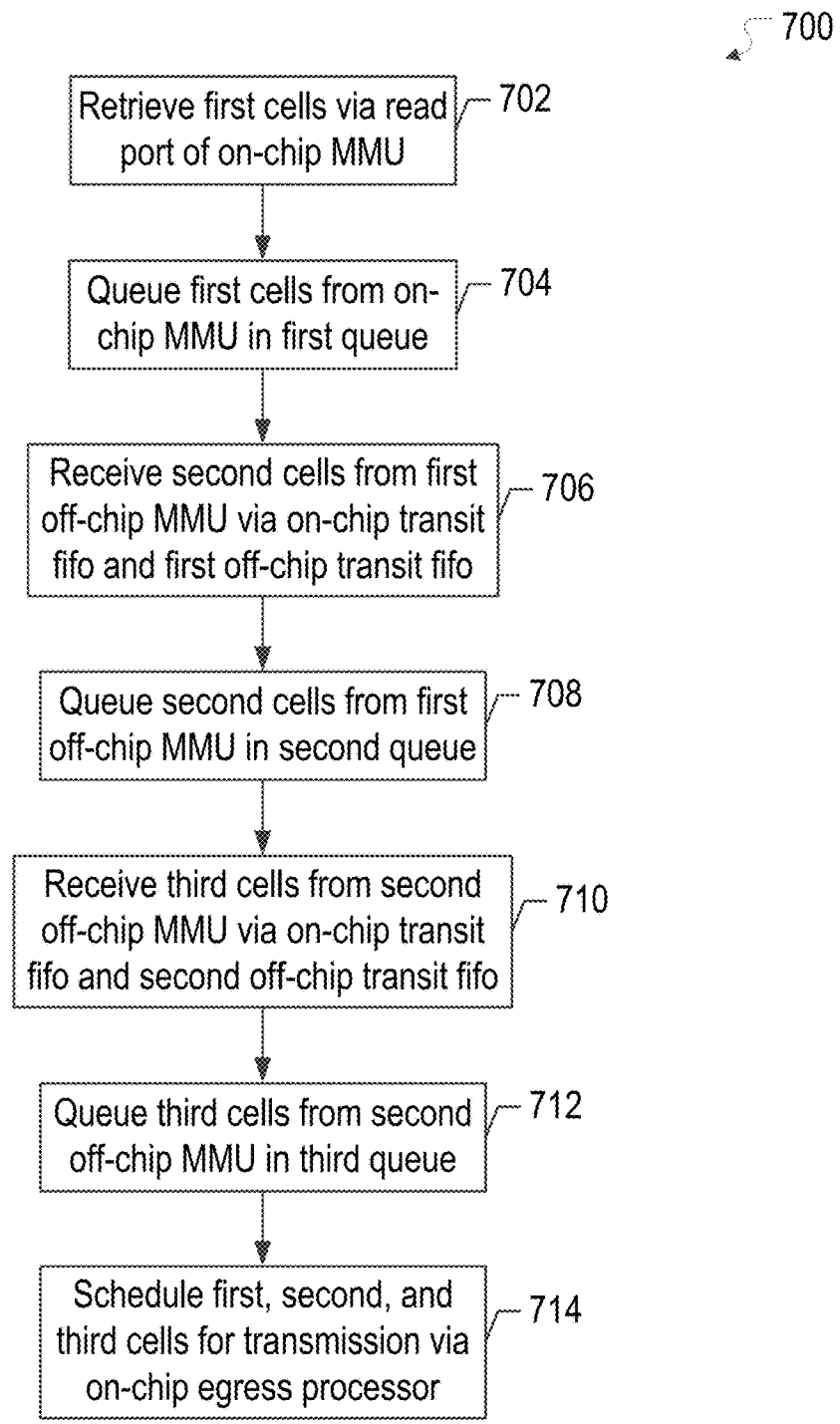
FIG. 7 illustrates a flow diagram of an example process of an egress cell fifo of an example switch chip of a switch device implementing a scalable low-latency mesh interconnect for switch chips in accordance with one or more implementations.

FIG. 7 illustrates a flow diagram of an example process 700 of an egress cell fifo 215A of an example switch chip 210A of a switch device 110 implementing a scalable low-latency mesh interconnect for switch chips in accordance with one or more implementations. For explanatory purposes, the example process 700 is primarily described herein with reference to the egress cell fifo 215A of the switch chip 210A of the switch device 110 of FIGS. 2-3;

however, the example process 700 is not limited to the egress cell fifo 215A of the switch chip 210A of FIGS. 2-3, e.g. the example process 700 may be performed by one or more of the egress cell fifos 215A, 315 of the switch chips 210B, 310, and/or the example process 700 may be performed by one or more components of the egress cell fifo 215A. Further for explanatory purposes, the blocks of the example process 700 are described herein as occurring in serial, or linearly. However, multiple blocks of the example process 700 may occur in parallel. In addition, the blocks of the example process 700 may be performed a different order than the order shown and/or one or more of the blocks of the example process 700 may not be performed.

The egress cell fifo 215A retrieves first cells via a read port of an on-chip MMU 214A (702). The egress cell fifo 215A queues the first cells from the on-chip MMU 214A in a first queue 505A (704). The egress cell fifo 215A receives second cells from a first off-chip MMU 214B via the on-chip transit fifo 212A and a first off-chip transit fifo 212B associated with the first off-chip MMU 214B (706). The egress cell fifo 215A queues the second cells from the first off-chip MMU 214B in a second queue 505B (708). The egress cell fifo 215A receives third cells from a second off-chip MMU 314 via the on-chip transit fifo 212A and a second off-chip transit fifo 312 associated with the second off-chip MMU 314 (710). The egress cell fifo 215A queues the third cells from the second off-chip MMU 314 in a third queue 505C (712). The scheduler 510 of the egress cell fifo 215A then schedules the first, second, and third cells for transmission via the on-chip egress processor 218A, the on-chip port macro 217A, and one or more coupled ports (714).

Figure 8:
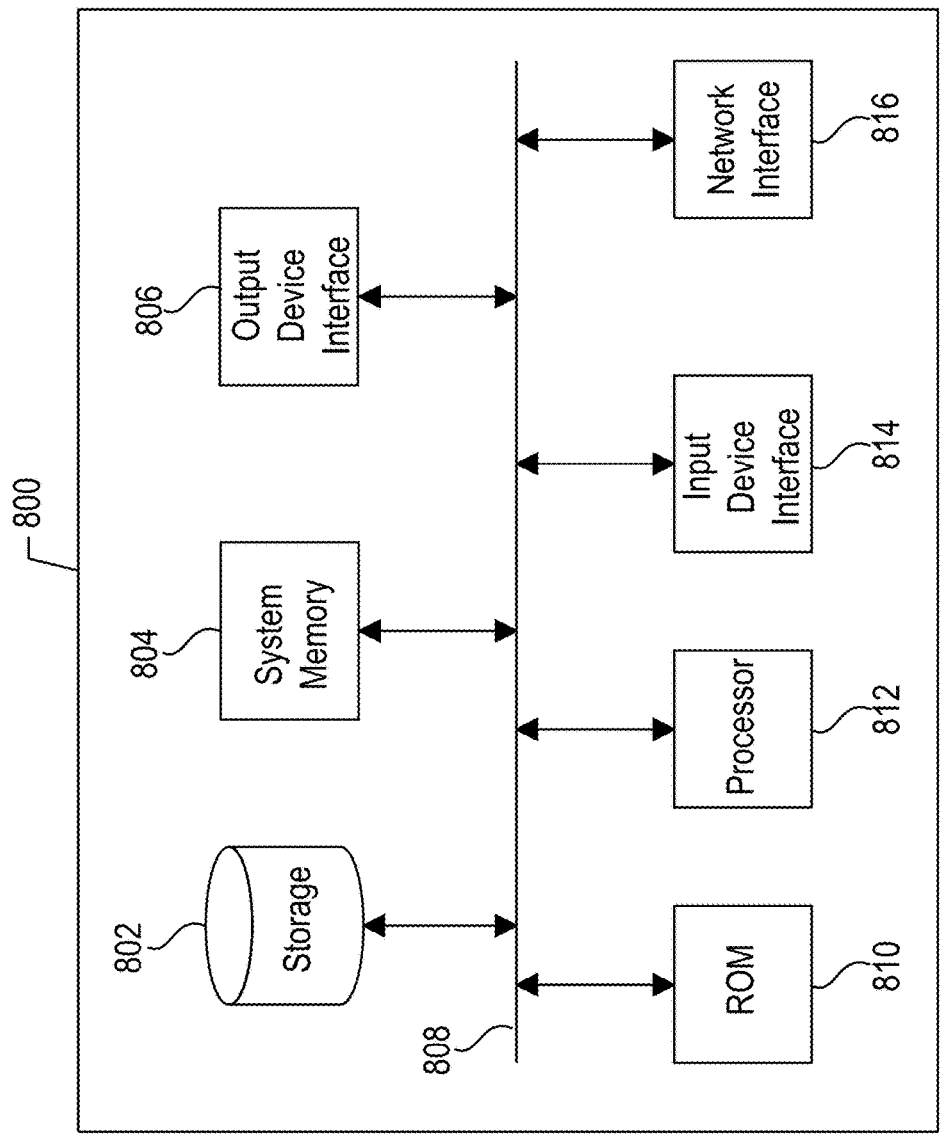
FIG. 8 conceptually illustrates an example electronic system with which one or more implementations of the subject technology can be implemented.

FIG. 8 conceptually illustrates an example electronic system 800 with which one or more implementations of the subject technology can be implemented. The electronic system 800, for example, may be, or may include, one or more of the electronic device 102, 104, 106, the switch device 110, a routing device, a desktop computer, a laptop computer, a tablet device, a phone, and/or generally any electronic device. Such an electronic system 800 includes various types of computer readable media and interfaces for various other types of computer readable media. The electronic system 800 includes a bus 808, one or more processing unit(s) 812, a system memory 804, a read-only memory (ROM) 810, a permanent storage device 802, an input device interface 814, an output device interface 806, one or more network interface(s) 816, and/or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are utilized by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory (RAM). The system memory 804 may store one or more of the instructions and/or data that the one or more processing unit(s) 812 may utilize at runtime. In one or more implementations, the processes of the subject disclosure are stored in the system memory 804, the permanent storage device 802, and/or the ROM 810. From these various memory units, the one or more processing unit(s) 812 retrieve instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by the electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, bus 808 also couples electronic system 800 to one or more networks (not shown) through one or more network interface(s) 816. The one or more network interface(s) may include an optical interface, an Ethernet interface, a wireless interface, a multimedia over coax alliance (MoCA) interface, a reduced gigabit media independent interface (RGMII), or generally any interface for connecting to a network. In this manner, electronic system 800 can be a part of one or more networks of computers (such as a local area network (LAN), a wide area network (WAN), or an Intranet, or a network of networks, such as the Internet. Any or all components of electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
    a memory management unit configured to buffer first or second cells for transmission;
    an egress cell circuit comprising at least a first queue and a second queue, the egress cell circuit configured to:
       queue the first cells from the memory management unit in the first queue;
       queue second cells from another memory management unit of another device in the second queue, the second cells being received from the another memory management unit via a transit circuit;
       schedule the first cells from the first queue and second cells from the second queue for transmission via an egress processor; and
       pass the first and second cells to the egress processor, the second cells bypassing the memory management unit that is configured to buffer the first or second cells; and
    the egress processor configured to transmit the first and second cells over at least one first port.

2. The device of claim 1, further comprising the transit circuit that is communicatively coupled to another transit circuit of the another device, the transit circuit configured to:
    receive the second cells from the another memory management unit of the another device via the another transit circuit without the second cells passing through another egress processor of the another device.

3. The device of claim 2, wherein the transit circuit comprises a receive queue, wherein the transit circuit is further configured to queue the second cells in the receive queue prior to passing the second cells directly to the egress cell circuit.

4. The device of claim 2, further comprising:
    an ingress processor configured to receive the first cells and provide the first cells to the memory management unit.

5. The device of claim 4, wherein the transit circuit is further configured to:
    receive a request for at least some of the first cells from the another transit circuit of the another device;
    retrieve the at least some of the first cells from the memory management unit; and
    transmit the at least some of the first cells to the another transit circuit of the another device for transmission via another egress processor over at least one second port of the another device, the at least some of the first cells not being transmitted via the egress processor of the device over the at least one first port.

6. The device of claim 4, wherein the transit circuit of the device is directly coupled to the another transit circuit of the another device via a first link, and the transit circuit of the device is separately indirectly coupled to the another transit circuit of the another device via a second link through an intermediary transit circuit of an intermediate device.

7. The device of claim 6, wherein the transit circuit comprises a scheduler configured to:
    receive first link information for the first link and second link information for the second link;
    determine one of the first or second link to transmit the at least some of the first cells to the transit circuit of the another device based at least in part on the first link information and the second link information; and
    transmit the at least some of the first cells to the another device via the determined first or second link.

8. The device of claim 7, wherein the device, the another device, and the intermediate device are each a separate integrated circuit.

9. The device of claim 8, wherein the separate integrated circuits are mounted on a common substrate and the transit circuit of the device is communicatively coupled to the another transit circuit of the another device via a serializer-deserializer interface.

10. The device of claim 4, wherein the ingress processor is further configured to:
    receive third cells and transmit the third cells directly to the egress cell circuit bypassing the memory management unit; and
    the egress cell circuit is further configured to schedule the third cells for transmission via the egress processor in conjunction with scheduling the first and second cells for transmission via the egress processor.

11. The device of claim 2, wherein the egress cell circuit comprises a scheduler configured to schedule the first cells from the first queue and the second cells from the second queue for transmission via the egress processor.

12. A device comprising:
    an ingress processor configured to receive first cells and provide the first cells to a memory management unit;
    the memory management unit configured to buffer the first cells for transmission;
    an egress processor configured to transmit at least a portion of the first cells over at least one first port;
    a transit circuit that is communicatively coupled to another transit circuit of another device, the transit circuit configured to:
       receive a request for at least some of the first cells from the another transit circuit of the another device;
       retrieve the at least some of the first cells from the memory management unit via a read port of the memory management unit; and
       transmit the at least some of the first cells to the another transit circuit of the another device for transmission via another egress processor over at least one second port of the another device, the at least some of the first cells bypassing the egress processor of the device.

13. The device of claim 12, further comprising:
    an egress cell circuit comprising at least a first queue and a second queue, the egress cell circuit configured to:

queue, in the first queue, the at least the portion of the first cells retrieved from the read port of the memory management unit;

queue, in the second queue, second cells retrieved from another memory management unit of the another device via the transit circuit; and schedule the at least the portion of the first cells from the first queue and the second cells from the second queue for transmission via the egress processor.

14. The device of claim 13, wherein the egress processor is further configured to transmit the at least the portion of the first cells and the second cells over the at least one first port.

15. The device of claim 13, wherein the transit circuit is further configured to:

receive a request for the second cells from the egress cell circuit;

request the second cells from the another transit circuit of the another device;

receive the second cells from the another memory management unit of the another device via the another transit circuit of the another device; and provide the second cells to the egress cell circuit bypassing the memory management unit.

16. A method comprising:

retrieving first cells from an on-chip memory management unit, the first cells having been received via an on-chip ingress processor;

receiving second cells from a first off-chip memory management unit and third cells from a second off-chip memory management unit, the second cells having been received via a first off-chip ingress processor and the third cells having been received by a second off-chip ingress processor;

scheduling the first, second, and third cells for transmission via an on-chip egress processor without buffering the second or third cells in the on-chip memory management unit; and transmitting the first, second, and third cells over at least one port via the on-chip egress processor.

17. The method of claim 16, wherein a first portion of the second cells are retrieved from the first off-chip memory management unit via a first link, the third cells are retrieved from the second off-chip memory management unit via the first link, and a remaining portion of the second cells are retrieved from the first off-chip memory management unit via a second link that is physically distinct from the first link.

18. The method of claim 16, wherein the second cells retrieved from the first off-chip memory management unit bypass a first off-chip egress processor associated with the first off-chip memory management unit and the third cells retrieved from the second off-chip memory management unit bypass a second off-chip egress processor associated with the second off-chip memory management unit.

19. The method of claim 16, further comprising:

queuing the first, second, and third cells in first, second, and third queues, respectively, prior to scheduling the first, second, and third cells for transmission, wherein the first, second, and third queues are separate from the on-chip memory management unit as well as the first and second off-chip memory management units.

20. The method of claim 16, further comprising:

receiving fourth cells directly from the on-chip ingress processor, the fourth cells bypassing the on-chip memory management unit; and scheduling the fourth cells for transmission via the on-chip egress processor without buffering the fourth cells in the on-chip memory management unit.

* * * * *